United States Patent [19]

Klappert

[11] Patent Number: 5,161,034
[45] Date of Patent: Nov. 3, 1992

[54] BRANCHING TABLE FOR INTERACTIVE VIDEO DISPLAY

[75] Inventor: Walter R. Klappert, Topanga, Calif.

[73] Assignee: WNM Ventures Inc., Burbank, Calif.

[21] Appl. No.: 381,574

[22] Filed: Jul. 18, 1989

[51] Int. Cl.$^5$ .............................................. H04N 5/85
[52] U.S. Cl. ................................................ 358/342
[58] Field of Search .................. 358/335, 342, 341; 369/32, 47, 48, 59; 360/19.1, 27

[56] References Cited

U.S. PATENT DOCUMENTS

| | | | |
|---|---|---|---|
| 4,305,131 | 12/1981 | Best | 358/342 |
| 4,375,100 | 2/1983 | Tsuji | 371/37.7 |
| 4,433,347 | 2/1984 | Sugiyama et al. | 358/342 |
| 4,446,488 | 5/1984 | Suzuki | 358/342 |
| 4,449,198 | 5/1984 | Kroon et al. | 358/342 |
| 4,490,810 | 12/1984 | Hon | 358/342 |
| 4,580,782 | 4/1986 | Ochi | 358/342 |
| 4,638,377 | 1/1987 | Dakin | 358/343 |
| 4,641,204 | 2/1987 | Sugiyama | 358/341 |
| 4,672,472 | 6/1987 | Sugiyama | 358/341 |
| 4,761,692 | 8/1988 | Yoshida et al. | 358/335 |
| 4,766,581 | 8/1988 | Korn et al. | 358/342 |
| 4,779,252 | 10/1988 | Custers et al. | 369/32 |
| 4,794,465 | 12/1988 | Van Luyt et al. | 358/341 |
| 4,839,743 | 6/1989 | Best et al. | 358/342 |
| 4,852,073 | 7/1989 | Shinohara et al. | 369/32 |
| 4,855,842 | 8/1989 | Hayes et al. | 358/342 |
| 4,905,094 | 2/1990 | Pocock et al. | 358/342 |
| 4,953,035 | 8/1990 | Yoshio | 358/335 |
| 4,959,734 | 9/1990 | Foster | 358/341 |
| 4,977,550 | 12/1990 | Furuya et al. | 369/32 |
| 4,989,097 | 1/1991 | Yoshio et al. | 358/335 |

Primary Examiner—Donald McElheny, Jr.
Attorney, Agent, or Firm—Blakely, Sokoloff, Taylor & Zafman

[57] ABSTRACT

Method and apparatus for enabling a user of a video laser disc to interact with the video image being displayed so as to provide capabilities which are either not available or difficult to implement using prior art techniques. An example of the use of the present invention would be to enable a user, while viewing a music video or movie, to be presented with a menu specifying choices which the user may make wherein the next program played is an item from the menu selected by the user. A branch table is encoded within what is known as a subcode channel of a laser video disc, which table is loaded into a memory and specifies information which identifies segments on the laser video disc to which the playback head of the laser video disc should go when a particular control button is pressed on a remote control.

17 Claims, 6 Drawing Sheets

|   | R | S | T | U | V | W |
|---|---|---|---|---|---|---|
| 0 | MODE | | | ITEM | | |
| 1 | COMMAND | | | | | |
| 2 | PARITY Q0 | | | | | |
| 3 | PARITY Q1 | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |
| 17 | | | | | | |
| 18 | | | | | | |
| 19 | | | | | | |
| 20 | PARITY P0 | | | | | |
| 21 | PARITY P1 | | | | | |
| 22 | PARITY P2 | | | | | |
| 23 | PARITY P3 | | | | | |

BTC=Branch Table Column

FIG. 3a

| | R | S | T | U | V | W |
|---|---|---|---|---|---|---|
| 0 | 1 | 1 | 1 | 0 | 0 | 0 |
| 1 | x | x | x | x | x | x |
| 2 | PARITY Q0 | | | | | |
| 3 | PARITY Q1 | | | | | |
| 4 | Branch Table Column | | | | Side | 10's |
| 5 | of Minutes | | | | 1's of Minutes | |
| 6 | 10's of Seconds | | | | 1's of Seconds | |
| 7 | Play/Grab | | | | Expansion | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |
| 17 | | | | | | |
| 18 | | | | | | |
| 19 | | | | | | |
| 20 | PARITY P0 | | | | | |
| 21 | PARITY P1 | | | | | |
| 22 | PARITY P2 | | | | | |
| 23 | PARITY P3 | | | | | |

FIG. 3b

| | R | S | T | U | V | W |
|---|---|---|---|---|---|---|
| 0 | 0 | 1 | 1 | 0 | 0 | 0 |
| 1 | x | x | 1 | 0 | 0 | 0 |
| 2 | Number of MIDI Bytes | | | | | |
| 3 | PARITY Q0 | | | | | |
| 4 | 1 | 0 | 0 | 0 | x | 1 |
| 5 | 1 | 1 | 0 | BTC for Branch 1 | | x |
| 6 | BTC for Branch 2 | | x | 0 | 0 | x |
| 7 | BTC for Branch p | | | BTC for Branch 3 | | |
| 8 | 1 | 0 | 0 | 0 | Side | Play/ |
| 9 | Grab | 0 | 0 | 10's of Minutes | | |
| 10 | 1's of Minutes | | 0 | 0 | 10's | |
| 11 | of Seconds | | 1's of Seconds | | | |
| 12 | | | | | | |
| 13 | | | | | | |
| 14 | | | | | | |
| 15 | | | | | | |
| 16 | | | | | | |
| 17 | | | | | | |
| 18 | | | | | | |
| 19 | | | | | | |
| 20 | PARITY P0 | | | | | |
| 21 | PARITY P1 | | | | | |
| 22 | PARITY P2 | | | | | |
| 23 | PARITY P3 | | | | | |

FIG. 3c

| # | R | S | T | U | V | W |
|---|---|---|---|---|---|---|
| 0 | 0 | 1 | 1 | 0 | 0 | 0 |
| 1 | x | x | Number of MIDI Bytes | | | |
| 2 | PARITY Q0 | | | | | |
| 3 | PARITY Q1 | | | | | |
| 4 | 1 | 1 | 1 | 1 | 0 | 0 |
| 5 | 0 | 0 | Manufacturer's ID | | | |
| 6 | 0 | 0 | 0 | 0 | 0 | 0 |
| 7 | 0 | 0 | 0 | 0 | 0 | 1 |
| 8 | 0 | 10's of Minutes | | | 1's of | |
| 9 | Minutes | 0 | 10's of Seconds | | | |
| 10 | 1's of Seconds | | 0 | Side | | |
| 11 | Branch Table Column | | | | x | x |
| 12 | 0 | | Play/Grab | | 10's of Minutes | |
| 13 | x | x | 0 | 10's of Seconds | | |
| 14 | 1's of Seconds | | | | 0 | 10's |
| 15 | of Seconds | | 1's of Seconds | | | |
| 16 | 0 | Side | Branch Table Column | | | |
| 17 | x | x | 0 | Play/Grab | | 10's |
| 18 | x | x | x | x | 0 | 10's |
| 19 | of Minutes | | 1's of Minutes | | | |
| 20 | PARITY P0 | | | | | |
| 21 | PARITY P1 | | | | | |
| 22 | PARITY P2 | | | | | |
| 23 | PARITY P3 | | | | | |

FIG. 3d

| # | R | S | T | U | V | W |
|---|---|---|---|---|---|---|
| 0 | 0 | 1 | 1 | 0 | 0 | 0 |
| 1 | x | x | Number of MIDI Bytes | | | |
| 2 | PARITY Q0 | | | | | |
| 3 | PARITY Q1 | | | | | |
| 4 | 0 | 10's of Seconds | | | 1's of | |
| 5 | Seconds | 0 | Side | x | 0 | Branch |
| 6 | Table Col. | x | x | x | x | Play/ |
| 7 | Grab | x | x | x | x | x |
| 8 | 0 | 10's of Minutes | | | 1's of | |
| 9 | Minutes | 0 | 10's of Seconds | | 0 | Side |
| 10 | Branch Table Column | | | | x | x |
| 11 | 1's of Seconds | | | | x | x |
| 12 | 0 | Play/Grab | | 1 | 1 | 1 |
| 13 | x | x | 1 | 1 | 0 | 0 |
| 14 | 0 | 1 | 1 | 0 | 0 | 0 |
| 15 | 0 | 0 | 0 | 0 | 0 | 0 |
| 16 | 0 | 0 | 0 | 0 | 0 | 0 |
| 17 | 0 | 0 | 0 | 0 | 0 | 0 |
| 18 | 0 | 0 | 0 | 0 | 0 | 0 |
| 19 | 0 | 0 | 0 | 0 | 0 | 0 |
| 20 | PARITY P0 | | | | | |
| 21 | PARITY P1 | | | | | |
| 22 | PARITY P2 | | | | | |
| 23 | PARITY P3 | | | | | |

BRANCHING TABLE FOR INTERACTIVE VIDEO DISPLAY

SUMMARY OF THE INVENTION

The present invention is a method and apparatus for enabling a user of a video laser disc to interact with the video image being displayed so as to provide capabilities which are either not available or difficult to implement using prior art techniques. An example of the use of the present invention would be to enable a user, while viewing a music video or movie, to be presented with a menu specifying choices which the user may make wherein the next program played is an item from the menu selected by the user. The menu could, for example, provide the user with four program choices as follows A. An interview with the recording artist;
B. A listing of other albums by the same artist;
C. A background video on how the music video was made; or
D. Replay the music video.

The user, by use of a remote control, would select choice (A), (B), (C) or (D) by pressing an appropriate button on the remote control which will cause the laser disc player to locate the portion of the disc at which the user's selection begins and then play the selection.

The menu is just another segment of video information on the laser disc, and if no selection is made during the time interval that the menu is displayed and the menu display is not being displayed in pause mode, the laser disc player will simply roll into the next sequential item on the laser disc. Once the menu ceases to be displayed, pressing the button on the remote control has no effect, or causes some other function to be performed.

In the prior art, a user's interaction with a laser video is limited to tasks such as fast forward, rewind or go to a selected chapter or frame number. Such tasks however are not interactive as that term is utilized with respect to the present invention. That is, in the prior art, while a user may at any time request the player to, for example, go to the beginning of chapter 4, such choice is completely unilateral on the part of the user and is independent of the video being displayed at the time the selection is made.

True interactive uses of laser discs are known, one example of which is a device used at the point of sale in retail stores. These devices typically provide information to a customer about a product or service. The customer makes a selection by pressing a button or touching a particular point on the video display. However, such devices differ from the present invention in that the necessary programming is typically stored in a RAM or ROM which is usually loaded from a source other than the laser disc. To the extent that any programming information is stored on the laser disc itself, in the prior art, it is believed that such storage is limited to the vertical blanking region of the video channel.

DETAILED DESCRIPTION OF THE INVENTION

A method and apparatus are disclosed for encoding certain data within what is known as a subcode channel of a laser video disc, which data is loaded into a memory and specifies information which identifies segments on the laser video disc to which the playback head of the laser video disc should go when a particular control button is pressed.

The subcode channel is a region set aside on a laser disc, by an industry standard, for storage of information other than information which is stored in two other areas which are known as the main audio channel and the video channel. Specifically, within a single chapter of a laser video disc, one portion is set aside for video channel information and a second portion for audio information. The audio information portion itself comprises two portions known as main channel audio and the subcode channel. The audio information portion has the same format used on audio compact discs. Presently, most laser discs, like most compact discs, do not use the subcode channel portion at all. However, to the extent the subcode channel is used, it is used to store graphical information or MIDI information as described in U.S. patent application Ser. No. 211,355 filed: June 24, 1988 (MIDI) and Ser. No. 287,423 filed: Dec. 20, 1988 (graphical). Although the graphical data and MIDI data which may be stored in the subcode channel result in the production of images and sounds, the images and sounds produced by data in the subcode channel are of much lower resolution than the video information stored in the video channel, and musical notation (MIDI) data rather than audio information contained in the main channel. By way of example, a full screen of video information from the video channel loads every 1/30th of a second. In contrast, graphic information stored in the subcode channel can load a slightly smaller screen in about 12 seconds with significantly lower color and spatial resolution. The digital audio in the main channel can deliver over 176,000 bytes per second, while the subcode channel is capable of less than 4,000 useful bytes per second.

Figure 1:
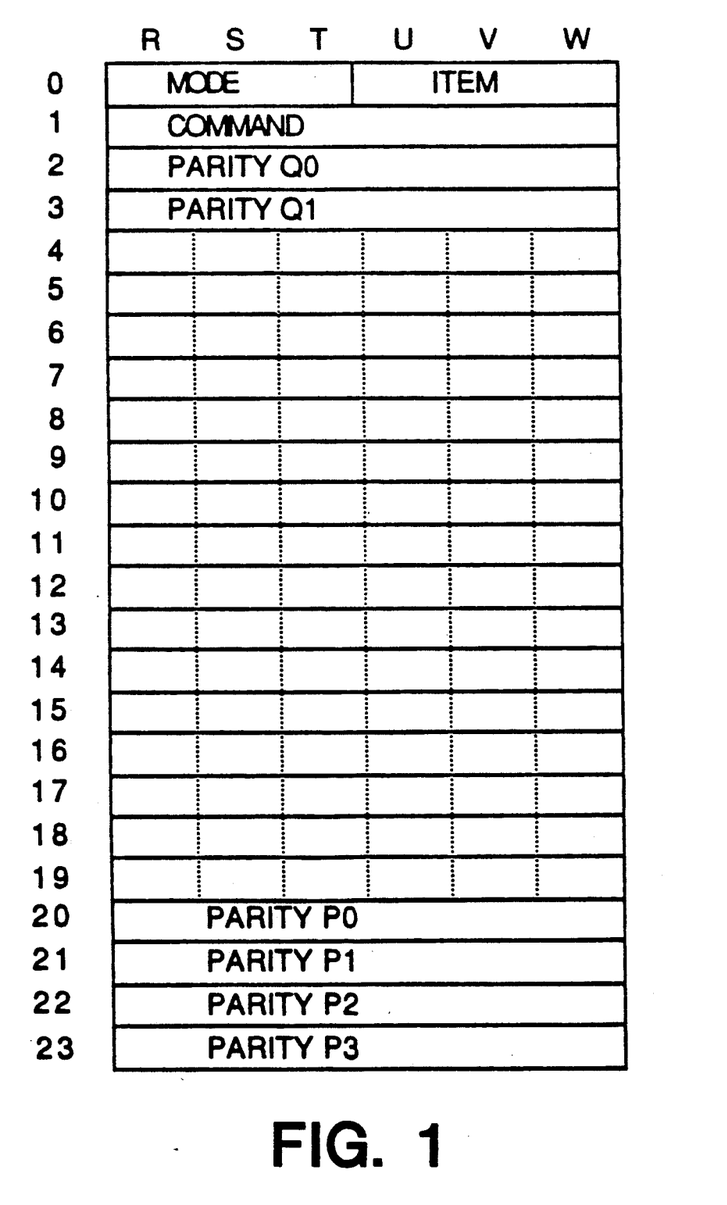
FIG. 1 shows the general format of a subcode pack.

The subcode channel, in effect, stores binary data in an industry standard format. The binary data in the subcode channel is stored in packs of 24 words (0-23) with each word consisting of six bits labeled R, S, T, U, W and V respectively as shown in FIG. 1. As shown in FIG. 1, the first 4 words and last 4 words are, in effect, reserved for other than data. Each of the bits in the subcode channel is referred to as one of six subchannels. Details regarding the format of subcode data as stored on a compact disc and as used on a laser video disc are set forth in a document known as the "Red Book" which is a technical specification created by Phillips N. V. and Sony Corporation entitled "Compact Disc Digital Audio System Description." The foregoing details are found in the section entitled "Sub Channels R, S, T, U, V and W."

In the present invention, data which is referred to herein as a branch table is stored in the subcode channel in a manner which will be specified in detail below.

The branch table provides a description of what a laser video disc player should do when a user presses a particular button on the player's remote control or control panel. Thus, pressing the button causes one of several functions to be performed. A "standard" laser disc remote control may contain the following buttons which, although not all used by the present invention, will be described for completeness:

1. Eject—A button which allows the laser disc to be stopped and ejected.

2. Pause—A button which freezes the laser disc where ever it is at the time the button is pushed. Although the audio is turned off, whatever image was being displayed when the pause button was pushed may continue to be displayed.

3. Play—A button which takes the laser disc player out of pause mode or which starts the laser disc playing when the player is first turned on.

4. Ten key pad—usually used to enter chapter or frame numbers. The present invention utilizes buttons from a ten key pad when an "index" menu is displayed. For example, the index may show the name of a music video and its relative time in minutes and seconds from the beginning of the laser disc and whether it is on side A or B. By entering a five digit number using the ten key pad, e.g., two digits for the minutes, two digits for the seconds and a 1 for side A or a 2 for side B, the user may go directly to the start of a desired selection. Since the use of the present invention is greatest when a remote control is in use, this description will assume that a remote control is being used. However, the present invention would function in an identical manner if the various buttons described herein are located on the control panel of the player rather than on the player's remote control.

The following buttons are added to a "standard" laser disc remote controller for implementing the present invention:

1. A, B, C and D branching buttons. Pressing any one of these buttons and using information stored in the branch table causes the laser disc player to search to a new position on the disc and play the selection beginning at that position or grab a field at that position (described below).

2. Menu On—Turns off sub channel graphics channel 14 (which continuously loads a transparent color to wipe out the menu) and turns on channel 15 (which continuously loads a menu).

3. Menu Off—Turns off sub channel graphics channel 15 and turns on channel 14.

4. Index—Pressing the index button causes the laser disc player to go to the segment on the laser from which the index for the laser disc may be displayed.

5. Next—Pressing the next button causes the laser disc player to skip to the start of the next segment on the laser disc.

6. Last—When pressed, causes the laser disc player to go back to the last segment selected by the user by pressing the A, B, C, D, Index or Next buttons.

An example of the format of a portion of a branch table which may be utilized in the present invention is as follows:

TABLE I

| Begin | End | A | B | C | D | Index | Next | Cont. | Alt. Cont. |
|---|---|---|---|---|---|---|---|---|---|
| A0003X | A0007P | A1144G | A9999G | A9999G | A9999G | A5721G | A1528P | A0312P | A0007P |
| A0007X | A0034P | A9999F | A9999O | A1144G | A0231P | A5721G | A1528P | A0034P | A0034P |
| A0034X | A0103P | A1731P | A0743P | A9999G | A9999G | A5721G | A1528P | A0103P | A0103P |
| A0103X | A0133P | A1731P | A0432P | A0506P | A0813P | A5721G | A1528P | A0133P | A0133P |
| A0133X | A0148P | A0923P | A0432P | A0506P | A0813P | A5721G | A1528P | A0148P | A0148P |
| A0148X | A0230P | A0923P | A1108P | A0506P | A0743P | A5721G | A1528P | A1528P | A1731P |
| A0231X | A0312P | A9999G | A9999G | A9999G | A9999G | A5721G | A0003P | A0312P | A0312P |
| A0312X | A0345P | A0003P | A1528P | A5721G | A9999G | A5721G | A0003P | A0345P | A0345P |
| A0345X | A0431P | A0003P | A1731P | A5721G | A0231P | A5721G | A0003P | A0431P | A0431P |
| A0431X | A0432G | A0003P | A1731P | A5721G | A0231P | A5721G | A0003P | A9999G | A9999G |

Each line of the branch table represents a segment (e.g., a single music video, or a menu) and contains the information for each of ten items referred to above as Begin, End, A, B, C, D, Index, Next, Continue (Cont.), Alternate Continue (Alt. Cont.). Items A, B, C, D, Index, and Next correspond to buttons on the laser disc player remote control whose functionality has been described above. The item referred to as Begin specifies the relative start time of each segment or program on the laser video disc. The item referred to as End specifies the relative end time of each segment. The End time is not strictly necessary since, as will be explained below, branch table information is continuously being read and stored as the disc is playing. The item referred to as Continue specifies the start time of a segment to which the laser disc player should go if the End time of a segment has been reached without the user having pressed one of the buttons A, B, C, D, Index, Next or Last and a skip flag (defined below) is set.

The item referred to as Alternate Continue specifies the start time of a segment to which the laser disc player should go if an End time of a segment has been reached without the user having pressed one of the buttons A, B, C, D, Index, Next or Last and the skip flag is not set.

The format for each of these items in a single branch table row is side (A or B), minutes (00-99), seconds (00-99), action flag (P if the segment is to be played, G if a field is to be grabbed (meaning that a field is selected from any frame within the specified minute and second), X if no action is to be taken, F if the skip flag is to be set on, 0 if the skip flag is to be set off, T if the digital left and right audio channel is to be played and E if only the digital left audio channel is to be played. Additionally, if minutes is 99 and seconds is 99, no action is to be taken when the button corresponding to the item (A, B, C, D, Index, Next or Last) is pressed.

Thus, referring to the first row of Table 1, the first segment is on side A beginning at a relative time of 0 minutes and 3 seconds and ending at a relative time of 0 minutes and 7 seconds. If the A button is pushed, the player grabs a field on side A, at a relative time of 11 minutes and 44 seconds for display. If any of the buttons B, C or D is depressed, nothing happens. If the Index button is pressed, the player goes to 57 minutes 21 seconds of side A and grabs a field for display. If the Next button is pushed, the player plays the segment at side A, 15 minutes and 28 seconds. If the End time of 7 seconds is reached and the skip flag is set, the player plays the segment beginning at side A, 3 minutes and 12 seconds and if the skip flag is not set, the player plays the segment beginning at side A, 0 minutes and 7 seconds.

In order to implement the present invention, a laser disc video player must include i) a laser disc video subsystem; ii) a subcode channel decoder (graphics and MIDI); iii) a remote control interface circuit which receives signals from a remote control, and sends a command to the laser disc video subsystem instructing it to pause, play, or go to a specified location on the laser disc; and iv) a decoder interface circuit which receives branch table data from the decoder and stores the data in a RAM. As the laser disc video subsystem plays the laser disc, subchannel information is fed into the decoder which decodes the subchannel information and sends it to the decoder interface for storage in the RAM.

Figure 2:
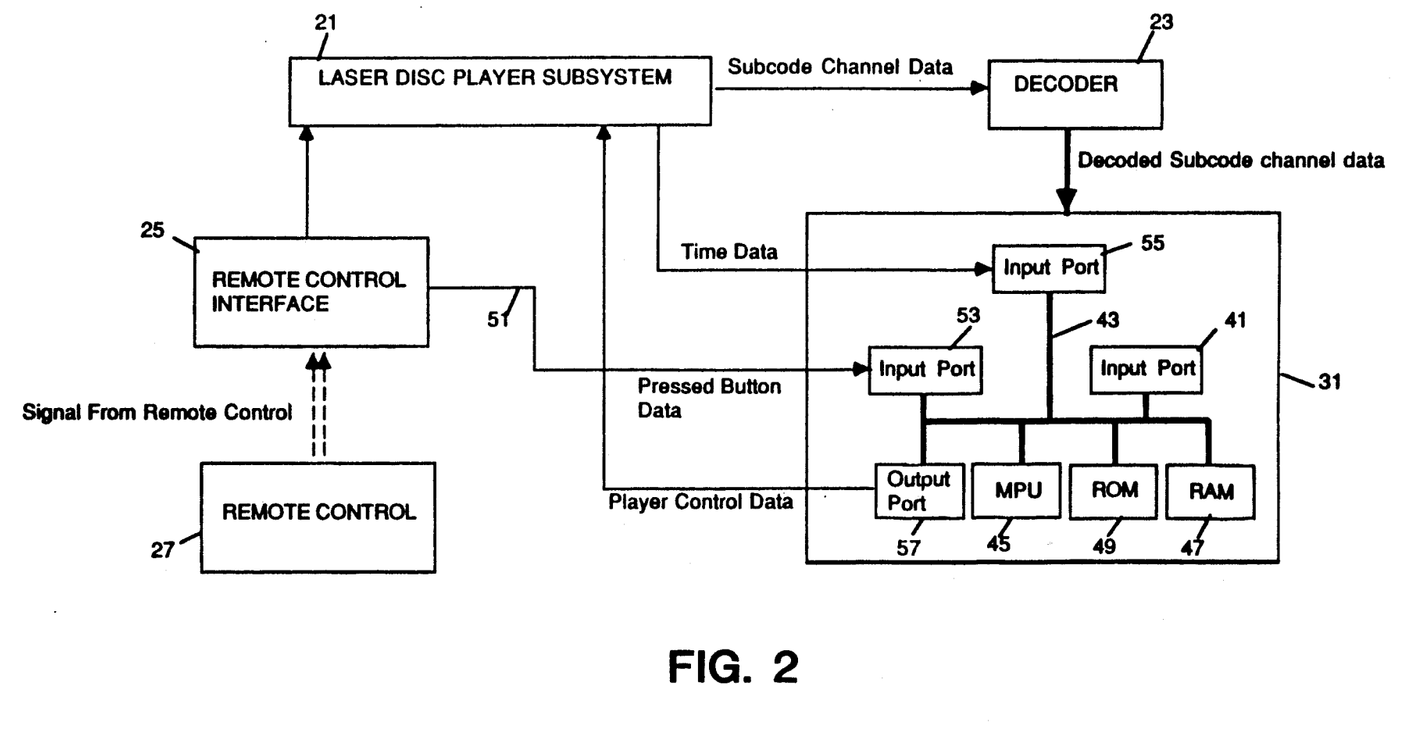
FIG. 2 is a block diagram of the various components needed to implement the present invention.

Specifically, referring to FIG. 2, according to the present invention, a laser disc video player comprises a laser disc subsystem 21, a decoder 23, remote control interface 25, remote control 27 and a decoder interface circuit 31. Laser disc video subsystem 21 is a commercially available laser disc video player available from Magnavox, Pioneer, Sony and others. Decoder 23 is a subchannel graphics or MIDI decoder is also a commercially available component manufactured by JVC as its Model No. VS-G11 (graphics) or VS-G11 with MIDI (MIDI). Interface 25 is essentially a prior art remote control interface circuit such as the type included in laser disc video players such as Pioneer's Model No. CLD-770. However, in the present invention, interface 25 is modified to provide a signal to decoder interface 31 which specifies which button on the remote is being pressed. Decoder interface 31 comprises a microprocessor with input and output ports and a memory for storing i) a program to run the microprocessor, and ii) branch table information generated by laser disc video subsystem 21 and decoded by decoder 23. Additionally, as noted above, remote control 27 is modified to include nine additional buttons Menu On, Menu Off, A, B, C, D, Index, Next and Last. A preferred embodiment for modifying remote control interface 25 and for implementing decoder interface 31 will be described below.

With respect to the modifications needed to be made to remote control 27, such modifications will be readily apparent to persons skilled in the relevant art.

Decoder 23 generates an output corresponding to the binary information in a subcode pack for each subcode pack whose Mode and Item are 7 and 0 (user mode) or 3 and 0 (MIDI mode). Although the present invention does not require Mode and Item to have any particular values, in order to ensure compliance with Red Book standards, the aforementioned values are the only permissible values. Decoder 23 output is 8 bit parallel data. (For MIDI implementations, decoder 23 provides serial MIDI data.) In the preferred embodiment, the 8 bit data is received by an input port 41 which latches the data and places the data onto bus 43. The data on bus 43 is then loaded by microprocessor (MPU) 45 unto RAM 47 according to a program in ROM 49. The specific details, clocking requirements and the like needed to load the data into RAM 47 are dependent upon the particular MPU which is utilized, which details will be readily apparent to persons skilled in the art.

The data received from decoder 23 (when Mode/Item are 7/0 or 3/0) is the branching table described above. Inasmuch as subcode channel information is read simultaneously with the video information and main channel audio information, the entire branch table can be loaded when the disc starts playing. However, a typical branch table has between 100 and 50,000 bytes and would take between approximately 1/30 and 14 seconds to load. Of course, until the branch table is fully loaded, the user could not use the remote control to issue commands which would cause accesses to the branch table. In this connection, since for any single program segment, the branch table will be 80 bytes long or less (which can be loaded in less than 1/10 of a second), the subcode channel data can be arranged so that the branch table is loaded as needed.

Once the branching table has been loaded into RAM 47, or at least as much as is needed for the program segment which is playing, the user may press one of the buttons A, B, C, D, Index, Next, Last or Alternate, Continue or buttons on the key pad ("Control Buttons").

Specifically, whenever remote control interface detects that a Control Button on remote control 27 has been depressed, a signal is placed on line 51 specifying the particular Control Button depressed. This signal is latched by input port 53. Input port or latch 53 is periodically polled to see if it has received new data, and if it has, the new data is placed on bus 43. Another input port or latch 55 which is updated during playback stores the current location of the playback head as a function of time relative to the beginning of the disc. This information is presently available in most laser disc players which include an LED display showing the relative time of the disc being played in minutes and seconds. Thus, the time information may be obtained by adding circuitry which converts the signals which drive the LED's to signals suitable for sending to input port 55, the specific details of which would be well within the abilities of one skilled in the relevant art. The program in ROM 49 then causes MPU 45 to execute a series of instructions which read the table in RAM 47 and issue commands through output port 57 which instructs laser disc player subsystem 21 to perform some function based upon the button which was depressed, the current position of the playback head and the data in the branch table.

The program in ROM 49 then causes MPU 45 to execute instructions placing data in output port 57, which in effect, are commands which, for example, cause the read head of laser disc player subsystem 21 to go to a particular location on the laser disc and begin playing the video and audio information at the point (and send whatever information is in the subchannel region to decoder 23). The particular commands issued by output port 57 depend upon the particular laser disc player subsystem 21 in use. However, inasmuch as the necessary functionality is usually provided on a control panel of the laser disc player by a series of push buttons, the implementation details will be readily apparent to persons skilled in the art.

Figure 4A:
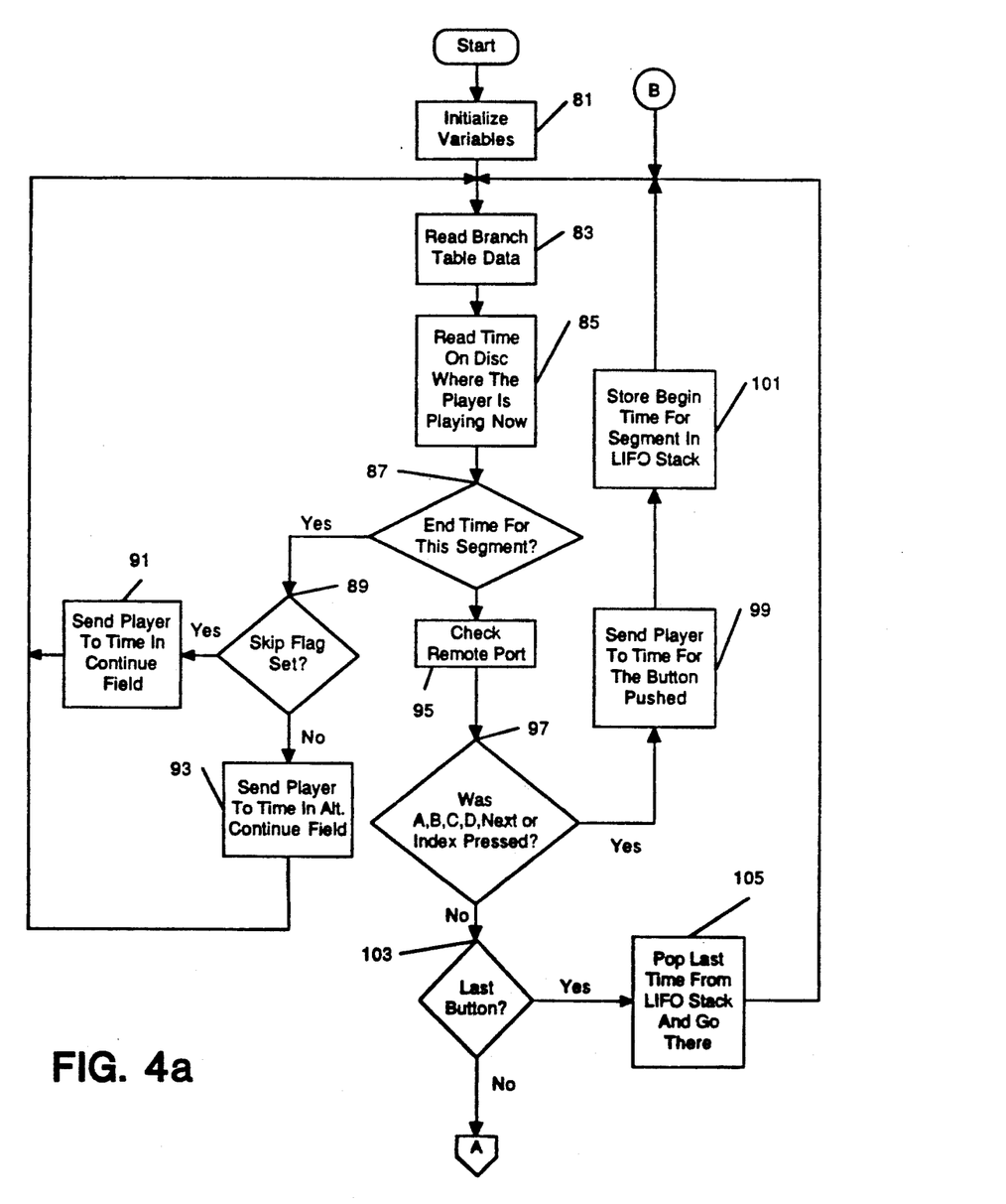
FIGS. 4a and 4b are a flow chart of a program needed to implement the present invention.
Figure 4B:
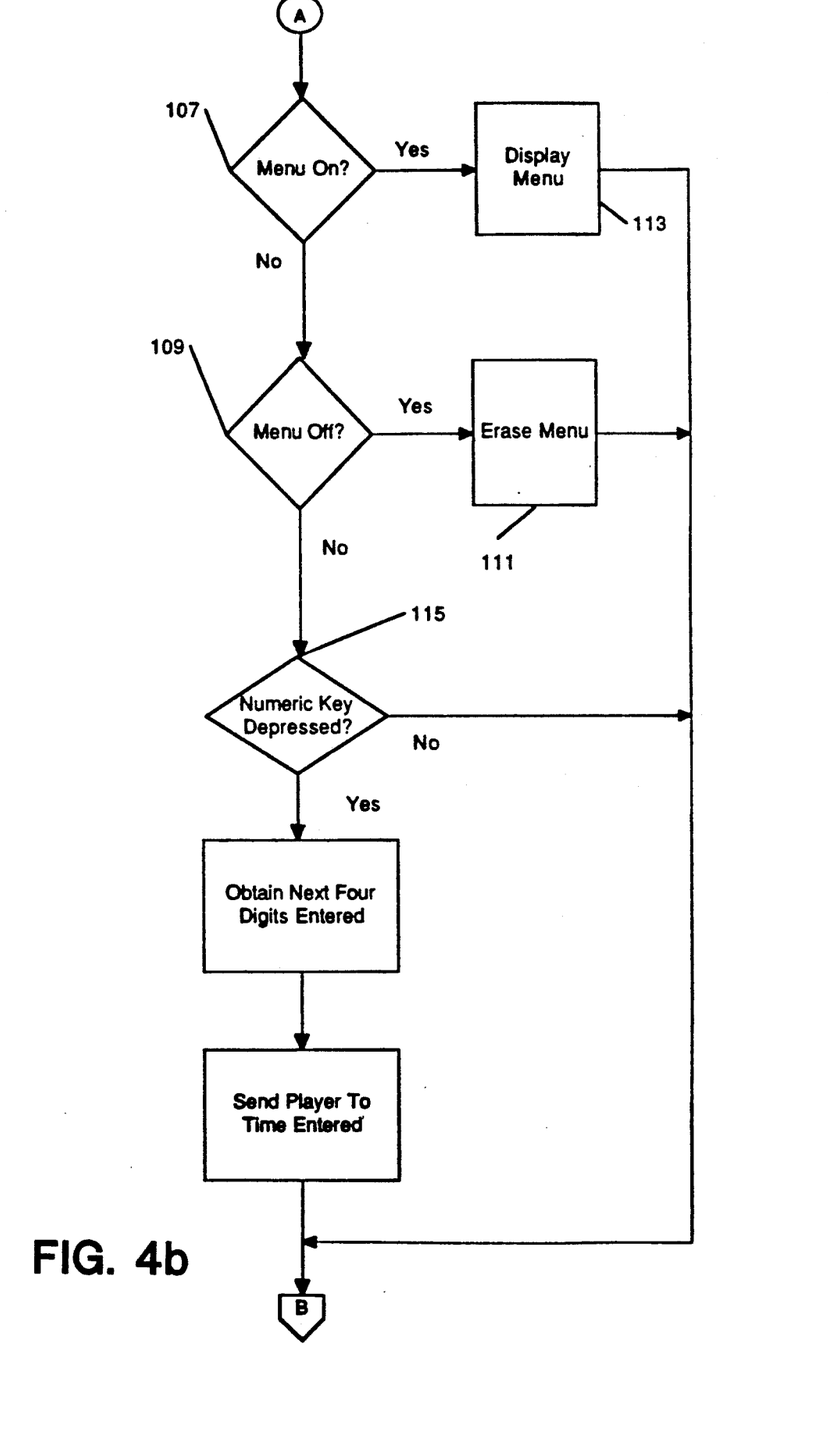

A flow chart for a suitable program stored in ROM 49 for use by MPU 45 is shown in FIGS. 4a and 4b. The flow chart assumes that branch table data for a particular segment is being continuously read as the segment is being played rather than reading the branch table for the entire disc in advance. Thus, on start-up, the program initializes variables as indicated in block 81 such as, the skip flag is set on, the menu is set off and the disc side is set to the A side. Once the variables have been initialized, the program executes a continuous loop beginning with reading the branch table data, converting the read data into rows and columns of branch table information and storing the same in RAM 47 as indicated in block 83, then determining the current location of the playback head as indicated in block 85 by polling input port 55. By determining the current position of the playback head, which as noted above, is a relative time from the beginning of the disc, the current time can be compared with the end time for the segment in the current branch table. If the end time for the segment has been reached, as indicated in block 87, the skip flag is tested as indicated in block 89. If the skip flag is set, the player is sent to the time in the continue field of the branch table for the current segment as indicated in block 91, and if the skip flag is not set, then the player is sent to the time in the branch table alternate continue field as indicated in block 93. If the decision in block 87 indicates that the end time for the current segment has not been reached, then the remote port, i.e. port 53, is checked to determine whether a button on the remote or on the control panel has been depressed as indicated in block 95. If the A, B, C, D, Next or Index button was pressed, as determined by block 97, then the player is sent to the time in the branch table for the current record corresponding to the button which was depressed, and the begin time for the current segment is stored in a last and first out (LIFO) stack as indicated in blocks 99 and 101. If the decision made by block 97 was that none of A, B, C, D, Next or Index was pressed, then a further determination is made to see if the Last button was pressed as indicated in block 103. If the Last button was pressed, then the time stored in the LIFO stack is popped and the player goes to that time as indicated in block 105. If the decision in block 103 determines that the Last button was not pressed, then a further determination is made as to whether the Menu-on or Menu-off buttons have been depressed as indicated in blocks 107 and 109 and, if depressed, the menu is displayed or the menu is turned off respectively as indicated in blocks 111 and 113. Finally, if a number from the the keypad was pressed, then the remaining four digits for time entry are obtained and the player is sent to the entered time as indicated in blocks 115, 117 and 119. The details for coding a suitable program which operates according to the flow chart of FIGS. 4a and 4b would be well within the abilities of a person skilled in the relevant art.

Figure 3A:
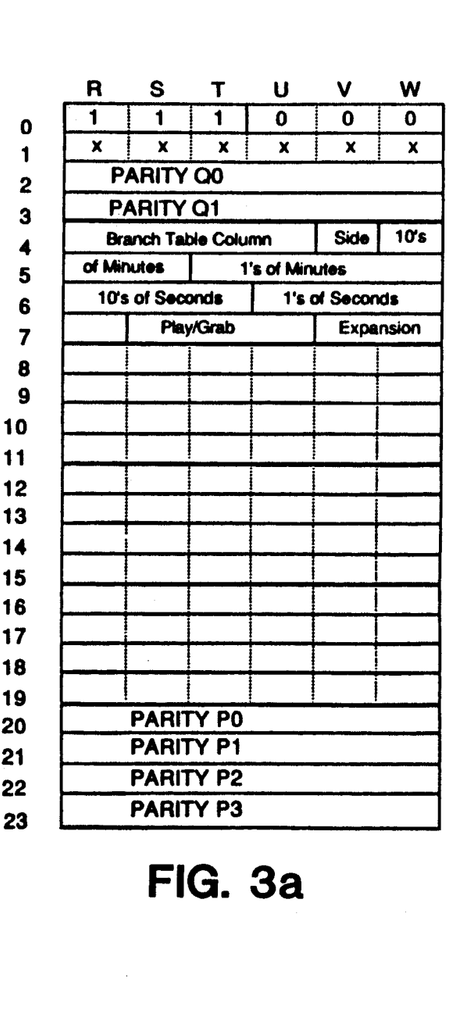
FIGS. 3a-3d show various schemes for encoding branch table entries in subcode packs.

Referring now to FIG. 3a, a first example showing how branch table information may be encoded into subcode packs is shown. As noted from FIG. 1, the R, S and T subchannels of word 0 is the Mode and the U, V and W subchannels of word 0 is Item. In this connection, according to the Red Book definition, when Mode=7 and Item=0 the subcode pack is in "user" mode meaning that the formatting of words 4-19 may be defined by the user. In this connection, when in user mode, the command word (word 1) is not needed and its R-W subchannels are don't cares, i.e., may be binary 0's or binary 1's. Using this format, four words are required to store a single row-column entry of the branch table. Thus, referring to rows 4-7 of FIG. 3a, the first four bits of word 4 specify the branch table column which may be defined as follows.

Word 4 subchannel V specifies side A or B wherein 0 corresponds to side A and 1 corresponds to side B. Word 4, subchannel W to word 5, subchannel S are three bits which specify the tens of minutes portion of that branch table column entry and subchannels T-W of word 5 specify the ones of minutes for that branch table column entry. Similarly, the R, S and T subchannels of word 6 specify the tens of seconds and word 6, subchannels U-W to word 7, subchannel R specify the one's of seconds. Word 7, subchannels S-U are three bits which specify the play/grab value for the specified branch table column entry. These three bits are encoded as follows:

TABLE II

| |
|---|
| 0 = Do nothing special ("X") |
| 1 = Play ("P") |
| 2 = Grab ("G") |
| 3 = Turn on skip flag ("O") |
| 4 = Turn off skip flag ("F") |
| 5 = Digital left and right ("T") |
| 6 = Digital left only ("E") |
| 7 = not used |

Subchannels V and W of word 7 are not used but may be used for expansion.

In a similar manner, words 8-11, 12-15 and 16-19 contain the next three branch table column entries. Thus, each subcode pack can contain up to 4 branch column entries for a single row of the branch table, meaning that two and one half packs are needed to contain all of the entries for a particular row of the branch table.

Another example showing how branching table information may be encoded into subcode packs is identical to that shown in FIG. 3a excepting that Mode and Item are something other than 7 and 0 respectively. However, this format would not be in compliance with the Red Book.

Figure 3B:
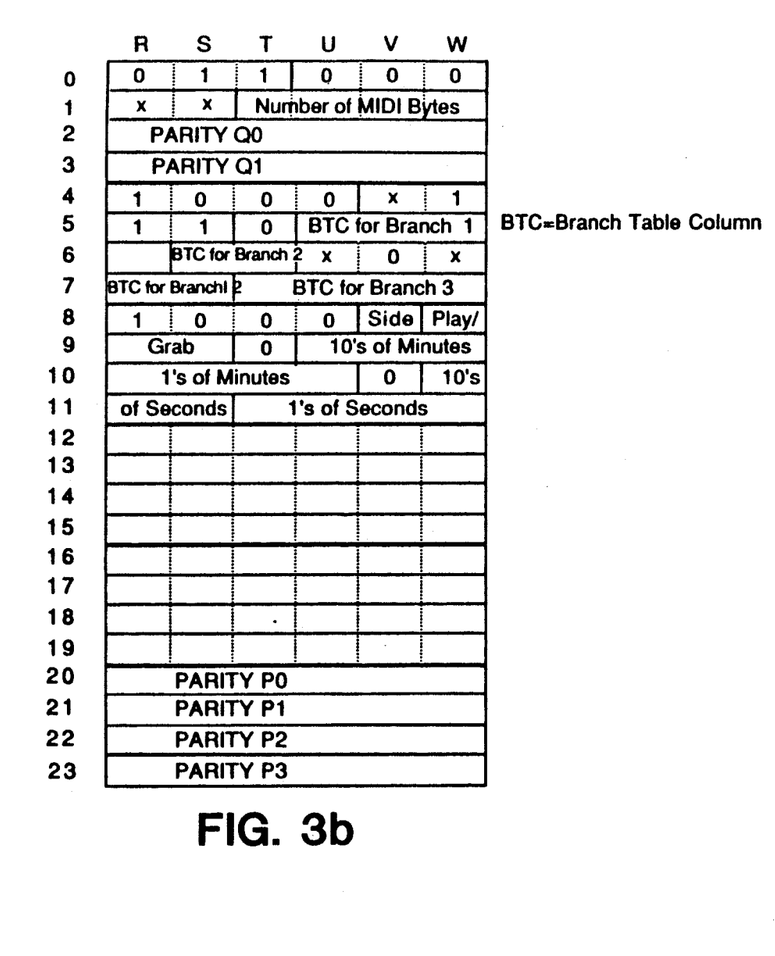

Another example showing how branching table may be encoded into subcode packs is shown in FIG. 3b wherein it is stored as MIDI data meaning that Mode=3 and Item=0. For MIDI data, the command term, i.e., subcode channels T, U, V and W of word 1, contains the number of MIDI bytes in the subcode pack which, if the pack is full, would be equal to 12.

A MIDI instruction consists of 4 bits for a MIDI command, 4 bits for a MIDI channel, 1 bit containing a 0, 7 bits containing a MIDI note value, 1 bit containing a 0 and 7 bits containing MIDI velocity. These 24 bits corresponding to 4 words of a subcode pack are used to contain branching table information for 3 columns for a single row of branch table data as follows. Words 4-7 are used to identify the three branch table columns which are defined in words 8-11, 12-15 and 16-19 respectively. Specifically, the first 4 bits of word 4 (subchannels R-U) contain a "1000" which is a MIDI Off command. This is done so that any MIDI devices connected to the laser disc player would be turned off and ignore any data which follows until a valid MIDI command is received. The 4 bits corresponding to the MIDI channel, i.e., word 4, subchannels V and W and the word 5, subchannels R and S are "0111" or "1111" (decimal 7 or 15) indicating that this is the first Note Off in a series of Note Offs which contain branch table information. These four bits correspond to the play/grab field for words 8-11, 12-15 and 16-19. The 7 (or 15) in this field specifies that the remaining information in this grouping of four words contains branch table column information and not the other information specific to a branch table entry since, as noted above in Table II, 7 (or 15) is not used for the play/grab field. Word 5, subchannels U, V, W and Word 6, subchannel R contain the branch table column for the branch table entry contained in words 8-11. Word 6, subchannels S and T and Word 7, subchannels R and S contain the branch table column for the branch table entry contained in words 12-15. Word 7, subchannels T-W contain the branch table column for the branch table entry contained in words 16-19. The four bits representing the branch table column are encoded as follows (the numbers to the left of the = are decimal,) the designation to the right of the = conforms to the column headings in Table I):

TABLE III

| | |
|---|---|
| 1 = | Begin |
| 2 = | End |
| 3 = | A |
| 4 = | B |
| 5 = | C |
| 6 = | D |
| 7 = | Index |
| 8 = | Next |
| 9 = | Continue |
| 10 = | Alternate Continue |
| 11-15 = | not used |

Each branch table entry as shown in words 8-11 of FIG. 3b contains the MIDI-Off command in word 8, subchannels R-U, the side (A or B encoded as 0 or 1) in word 8, subchannel V, the play/grab field value in word 8, subchannel W and word 9 subchannels R and S, the tens of minutes in word 9, subchannels U-W, the ones of minutes in word 10, subchannels R-U, the tens of seconds in word 10, subchannel W and word 11 subchannels R and S, and the ones of seconds in word 11, subchannels T-W. The next two branch table entries contained in words 12-15 and 16-19 respectively have the same format as that specified for words 8-11.

Using the format of FIG. 3b, three branch table column entries can be specified in a single MIDI pack. Thus, using this format, five words are required to store a single row column entry of a branch table. Since there are ten columns for each row of a branch table entry, three and one half packs are required to store a complete branch table entry. Although less efficient than the format shown in FIG. 3a, there is an advantage in that since the existing MIDI format is being used, it can be assured that there will be no conflict with other users who conform to the Red Book.

Figure 3C:
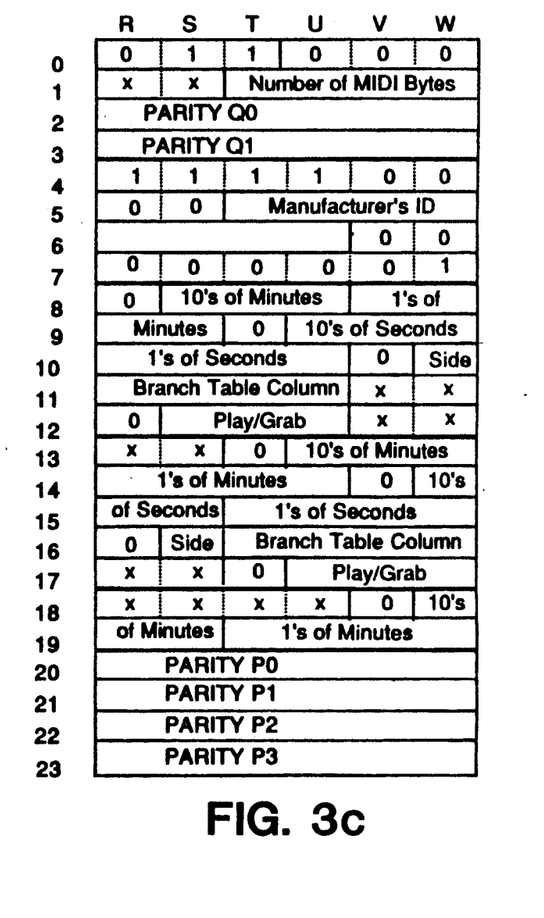
Figure 3D:
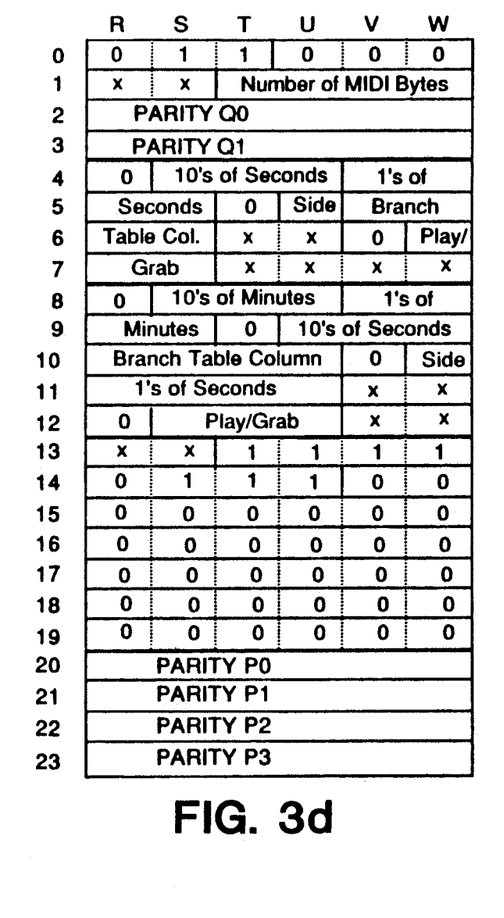

A fourth example of how branch table entries may be encoded into subcode packs is shown in FIGS. 3c and 3d. In this example, the packs are encoded as having MIDI data by setting Mode=3 and Item=0. However, instead of specifying that each MIDI command begins with a Note-Off, the first entry is specified as initiating a system exclusive by placing "11110000" in word 4, subchannels R-W and word 5 subchannels R and S. A manufacturer's I.D. is placed in word 5, subchannels T-W and word 6, subchannels R-U. The manufacturer's I.D. is unique to a manufacturer of MIDI equipment and is assigned by MMA (MIDI Manufacturers Association) and the JMSC (Japan MIDI Standards Committee). Word 6, subchannels V and W and word 7, subchannels R-W are defined to contain "00000001" meaning branch table data follows.

Once a subcode pack with the system exclusive command has been specified, the rest of that subcode pack and subsequent subcode packs may be defined in any manner until an end of system exclusive command appears which is defined as "11110111". Using this scheme, a branch table entry may be defined using 32 bits (referring to FIG. 3c), in words 8 thru 13, with word 13 having only subchannels R and S utilized; 0 followed by 3 bits containing the tens of minutes, 4 bits containing ones of minutes, 0, 3 bits bits containing tens of seconds, 4 bits containing ones of seconds, 0, 1 bit containing the side, 4 bits containing the branch table column, 2 bits which are unused, 0, 3 bits bits containing the play/grab value and 4 bits which are unused. The next branch table column entry begins at word 13, subchannel T and follows the same format as described above. Subsequent branch table column entries follow in a like manner as shown in FIGS. 3c and 3d wherein the branch table column which begins at word 18, subchannel V is completed in the next subcode pack at word 7, subchannel W with a last branch table column entry being shown beginning at word 8, subchannel R and ending at word 13, subchannel S after, which the end system exclusive command appears.

By using the system exclusive MIDI format, each rowcolumn branch table entry requires 32 bits including 6 bits which are unused and therefore are available for future expansion. In this connection, inasmuch as only the first subcode pack contains the system exclusive command and only the last pack contains the end of system exclusive command, excepting for the first and last packs, there are 96 bits available for data in each subcode pack. Thus, an average of 3 row-column branch table entries may be placed into each subcode pack. While this encoding scheme has approximately the same efficiency as the scheme of FIG. 3b, FIG. 3b does not provide for 6 unused bits for each row-column branch table entry for future expansion.

What is claimed is:

1. An apparatus for providing interactive control of a video laser disc player, said video laser disc player including a laser disc having at least one chapter for reading by a playback head, said chapter having a portion for storing video information and a portion for storing audio information, said audio information portion having a main channel audio portion and a subcode channel portion, said subcode channel portion having branch table information stored therein, said apparatus comprising:

a) means for reading said branch table information, said reading means including:
  i) a subcode channel decoder coupled to said player adapted to receive information stored in said subcode channel as it is read by said playback head and decode said information into subcode packs;
  ii) means for converting the subcode packs into rows and columns of branch table information;
b) storage means for storing said read branch table information;
c) means for determining the time position of said playback head relative to said laser disc;
d) means for determining which one of a plurality of control buttons has been depressed by an operator of the player;
e) means for generating control signals which direct the playback head of said player to a position on said laser disc as a function of the branch table information, the relative position of said playback head and the control button determined to have been depressed by said operator.

2. The apparatus defined by claim 1 wherein said storage means comprises a random access memory coupled to said reading means.

3. The apparatus defined by claim 1 wherein said control button determining means comprises:

a) an interface circuit coupled to said player for generating data specifying which one of said plurality of control buttons has been depressed;
b) latch means coupled to said interface circuit for storing the data generated by said interface circuit.

4. The apparatus defined by claim 1 wherein said control signal generating means comprises a microprocessor coupled to a memory storing a control program, said storage means, a first input port coupled to said decoder, a second input port coupled to said control button determining means, a third input port coupled to said position determining means and an output port coupled to said player, wherein said control program is executed by said microprocessor and causes said microprocessor to generate control signals which:
   a) load said branch table information into said storage means;
   b) poll said third input port to determine the time position of said playback head relative to said laser disc;
   c) determine whether an end of segment has been reached by said playback head;
   d) if the end of segment has been reached, go to a);
   e) poll said second input port to determine whether one of said plurality of control buttons has been depressed;
   f) cause the playback head to go to a relative time stored in a field of said branch table corresponding to the control button, if any, determined to have been depressed;
   g) go to a).

5. The apparatus defined by claim 1 wherein said control signal generating means comprises a microprocessor coupled to a memory for storing a control program, said storage means, a first input port coupled to said decoder, a second input port coupled to said control button determining means, a third input port coupled to said position determining means and an output port coupled to said player, wherein said control program is executed by said microprocessor and causes said microprocessor to generate control signals which:
   a) load said branch table information into said storage means;
   b) poll said third input port to determine the time position of said playback head relative to said laser disc;
   c) determine whether an end of segment has been reached by said playback head;
   d) if the end of segment has been reached, determine whether a skip flag in the branch table for the segment is set and cause the playback head to go to a relative time stored in a continue field of said branch table if said skip flag is set and cause the playback head to go to a relative time stored in an alternate continue field of said branch table if said skip flag is not set;
   e) poll said second input port to determine whether one of said plurality of control buttons has been depressed;
   f) cause the playback head to go to a relative time stored in a field of said branch table corresponding to the control button, if any, determined to have been depressed;
   g) go to a).

6. The apparatus defined by claim 5 wherein said plurality of control buttons includes a menu on button and a menu off button, and if said menu on button is determined to have been depressed, cause a graphics channel to be selected containing menu information, and if said menu off button is determined to have been depressed, cause a graphics channel to be selected containing transparent color information for blanking displayed menu information.

7. The apparatus defined by claim 5 wherein said plurality of control button includes a numeric keypad and if time information is determined to have been entered, cause the playback head to go to the entered time position.

8. The apparatus defined by claim 1 wherein said control signal generating means comprises a microprocessor coupled to a memory for storing a control program, said storage means, a first input port coupled to said decoder, a second input port coupled to said control button determining means, a third input port coupled to said position determining means and an output port coupled to said player, wherein said control program is executed by said microprocessor and causes said microprocessor to generate control signals which:
   a) load said branch table information into said storage means;
   b) poll said third input port to determine the time position of said playback head relative to said laser disc;
   c) determine whether an end of segment has been reached by said playback head;
   d) if the end of segment has been reached, store the begin time for the segment in a LIFO stack, determine whether a skip flag in the branch table for the segment is set and cause the playback head to go to a relative time stored in a continue field of said branch table if said skip flag is set and cause the playback head to go to a relative time stored in an alternate continue field of said branch table if said skip flag is not set;
   e) poll said second input port to determine whether one of said plurality of control buttons has been depressed;
   f) cause the playback head to go to a relative time stored in a field of said branch table corresponding to the control button, if any, determined to have been depressed;
   g) go to a).

9. The apparatus defined by claim 8 wherein said plurality of control buttons includes a last button which, if determined to have been depressed, results in the begin time stored in said LIFO stack being popped and the playback head going to said begin time.

10. A method for providing interactive control of a video laser disc player, said video laser disc player including a laser disc having at least one chapter for reading by a playback head, said chapter having a portion for storing video information and a portion for storing audio information, said audio information portion having a main channel audio portion and a subcode channel portion, said subcode channel portion having branch table information stored therein, said method comprising the steps of:
   a) receiving information stored in said subcode channel as it is read by said playback head and decoding said information into subcode packs;
   b) converting the subcode packs into rows and columns of branch table information;
   c) storing said read branch table information;
   d) determining the time position of said playback head relative to said laser disc;

e) determining which one of a plurality of control buttons has been depressed by an operator of the player;

f) generating control signals which direct the playback head of said player to a position on said laser disc as a function of the branch table information, the relative position of said playback head and the control button determined to have been depressed by said operator.

11. The method defined by claim 10 wherein said control button determining step comprises the steps of:

a) generating data specifying which of said plurality of control buttons is being depressed;

b) storing the data generated by said data generating step.

12. The method defined by claim 10 wherein said control signal generating step comprises the steps of:

a) reading said stored branch table information;

b) determining the time position of said playback head relative to said laser disc;

c) determining whether an end of segment has been reached by said playback head, and if the end of segment has been reached, going to step a);

d) determining whether one of said plurality of control buttons has been depressed;

e) causing the playback head to go to a relative time stored in a field of said branch table corresponding to the control button, if any, determined to have been depressed;

f) going to step a).

13. The method defined by claim 12 wherein if said plurality of control buttons includes a menu on button and a menu off button, and if said menu on button is determined to have depressed, includes the further steps of causing a graphics channel to be selected containing menu information, and if said menu off button is determined to have been depressed, causing a graphics channel to be selected containing transparent color information for blanking displayed menu information.

14. The method defined by claim 12 wherein if said plurality of control buttons includes a numeric keypad and if time information is determined to have been entered, including the further step of causing the playback head to go to the entered time position.

15. The method defined by claim 10 wherein said control signal generating step comprises the steps of:

a) reading said stored branch table information;

b) determining the time position of said playback head relative to said laser disc;

c) determining whether and end of segment has been reached by said playback head and if the end of segment has been reached, determining whether a skip flag in the branch table for the segment is set and causing the playback head to go to a relative time stored in a continue field of said branch table if said skip flag is set and causing the playback head to go to a relative time stored in an alternate continue field of said branch table if said skip flag is not set;

d) determining whether one of said plurality of control buttons has been depressed;

e) causing the playback head to go to a relative time stored in a field of said branch table corresponding to the control button, if any, determined to have been depressed;

f) going to step a).

16. The method defined by claim 10 wherein said control signal generating step comprises the steps of:

a) reading said stored branch table information;

b) determining the time position of said playback head relative to said laser disc;

c) determining whether an end of segment has been reached by said playback head and if the end of segment has been reached, storing the begin time for the segment in a LIFO stack, determining whether a skip flag in the branch table for the segment is set and causing the playback head to go to a relative time stored in a continue field of said branch table if said skip flag is set and causing the playback head to go to a relative time stored in an alternate continue field of said branch table if said skip flag is not set;

d) determining whether one of said plurality of control buttons has been depressed;

e) causing the playback head to go to a relative time stored in a field of said branch table corresponding to the control button, if any, determined to have been depressed;

f) going to step a).

17. The method defined by claim 16 wherein if said plurality of control buttons includes a last button which, if determined to have been depressed, includes the further steps of popping the begin time stored in said LIFO stack and causing the playback head to go to said begin time.

* * * * *